March 10, 1970     J. D. ENSIGN     3,500,280

TEMPERATURE SENSING PROBE

Filed Aug. 21, 1967

INVENTOR:
JOHN D. ENSIGN
BY:
ATTORNEY 3,500,280
TEMPERATURE SENSING PROBE
John D. Ensign, Box 338, Brigham City, Utah 84117
Filed Aug. 21, 1967, Ser. No. 662,068
Int. Cl. H01c 7/00
U.S. Cl. 338—28                                    6 Claims

ABSTRACT OF THE DISCLOSURE

An improved probe for temperature sensing devices, particularly electronic, resistance thermometers. The probe has a wafer-type thermistor mounted in a ball tip so as to give very rapid heat sensing and it is provided with a flexible section designed to allow limited lateral bending of the otherwise longitudinally rigid probe and with a sheath retainer that is mounted for limited reciprocation, axially along the probe to allow sheaths used thereon to be tested for durability.

Brief description

Figure 1:
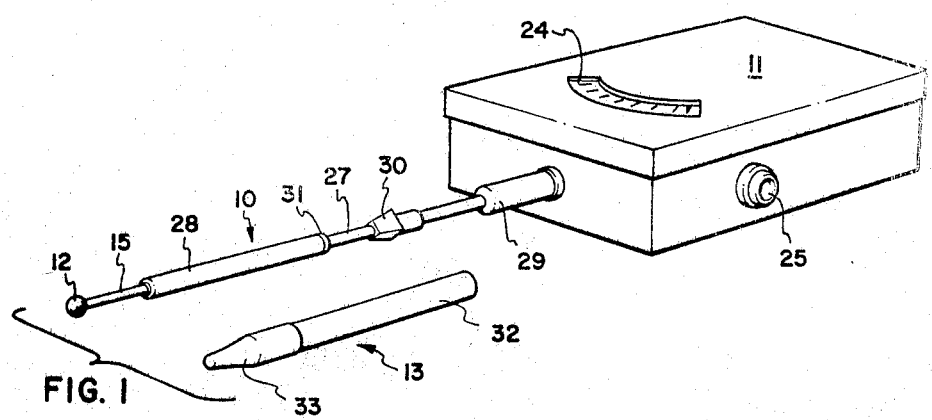

This invention relates to the probes of temperature sensing devices and especially for such probes used as components of electronic, resistance thermometers of the type disclosed in the co-pending application for patent of John D. Ensign and David M. Allen, Ser. No. 483,038, filed Aug. 27, 1965, now Patent No. 3,367,186. The invention is particularly related to probes having a retainer adapted to hold a disposable sheath of the type disclosed in the co-pending application for patent of John D. Ensign and Hideo Hashimoto, Ser. No. 489,122, filed Sept. 22, 1965, now Patent No. 3,349,896, in place.

Electronic thermometers, of the type disclosed in the aforementioned application of John D. Ensign and David M. Allen, have a probe that is adapted to be inserted into a body cavity of a patient. An element in the tip of the probe provides a resistance that is variable in accordance with the surrounding temperature and the element is part of an electrical circuit including a dial calibrated to indicate the temperature as a function of the variable resistance of the element. Because of their rapid response time and convenience, the electronic thermometers are becoming more and more popular, especially for hospital and clinic use. Their popularity has been increased even more with the advent of the low-cost, disposable sheaths heretofore mentioned. These sheaths include a rigid or semi-rigid, tubular section that is adapted to slip over the end of a probe and to be held by a retainer on the probe and a resilient diaphragm on one end of the tube that is adapted to be tautly stretched across the tip of the probe so that good heat transfer into and through the tip will be obtained.

The sheaths allow the electronic thermometer to be repeatedly used, without the necessity for sterilization of the probe between usages, and while particularly useful for use on the probes of electronic thermometers can also be used with other types of temperature sensing probes.

Nevertheless, the diaphragms of some of the sheaths rupture as they are used. If the rupture occurs as the sheath is being installed on the probe the user simply removes that sheath and installs another one. However, if the diaphragm ruptures as the probe is being inserted in the body cavity, or after insertion, the nurse or other user may not notice that it has ruptured, with the possibility that other subsequent patients can be contaminated. Even if the user does notice such a rupture, it then is necessary to sterilize the probe in accordance with standard, accepted, sterilization procedures, and these are time consuming and, consequently are expensive.

It is a principal object of the present invention to provide a probe having a sheath retainer thereon that can be used to check each sheath installed on the probe to be sure that the diaphragm will withstand the stresses to which it will be subjected during use.

Some degree of lateral flexibility of the probes used with electronic thermometers is desirable to prevent their injuring the patient as they are inserted into a body cavity and to prevent their being broken. The probes cannot be too flexible, however, or they cannot be manipulated by the user.

Thus, it is another object of the present invention to provide a probe, for use with electronic thermometers, that is laterally flexible throughout a portion of its length, with the degree of flexibility being limited to insure easy manipulation.

The probes of electronic thermometers must be constructed so that the temperature can be obtained reliably and in a minimum time, if the thermometer is to be commercially valuable.

Accordingly, still another object of the present invention is to provide a probe having a tip with a heat responsive variable resistance element mounted therein in such a manner that changes in the surrounding temperature will quickly change the resistance of the element.

Principal features of the probe of the invention include a small diameter, somewhat flexible inner tube, running the length of the probe, and serving as a conductor from one lead of a wafer-type thermistor mounted in a sterling silver ball forming the tip of the probe, and as a guide for the wire serving as a conductor from the other lead of the thermistor.

Additional reinforcement tubes of substantially rigid material surround the inner tube throughout most of its length and a flexible outer sleeve surrounds the inner tube throughout a portion of its length not surrounded by tubes of substantially rigid material to allow limited bending of the inner tube throughout this portion of the probe.

A sheath retainer is mounted on the probe and is slidable along a portion of the length of the probe between limit stops so that a sheath placed thereon can be manipulated to stretch its diaphragm more tautly than necessary across the probe tip as a test of the durability of the sheath and can thereafter be relaxed to have only the tautness required for proper use of the thermometer.

Additional objects and features of the invention will become apparent from the following detailed specification and drawings disclosing what is presently contemplated as being a best mode of carrying out the invention.

The drawings

Figure 2:
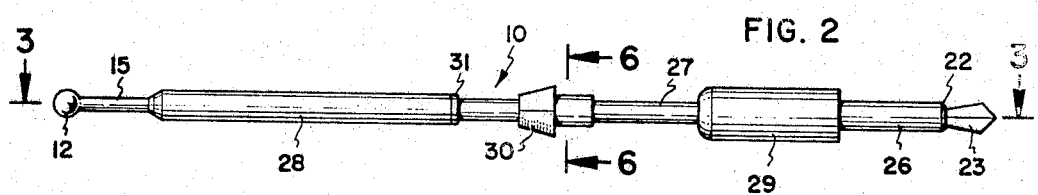
Figure 3:
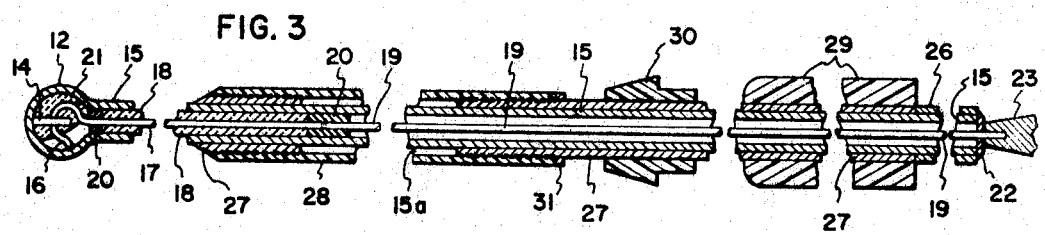
Figure 4:
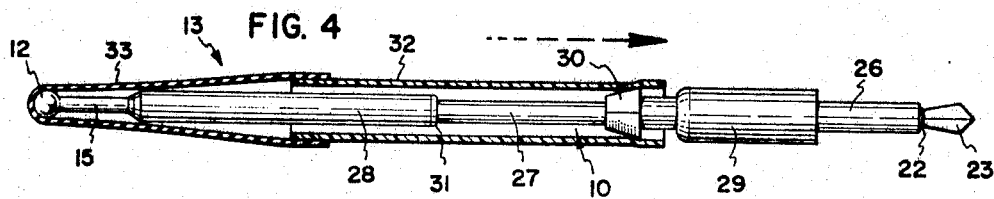
Figure 5:
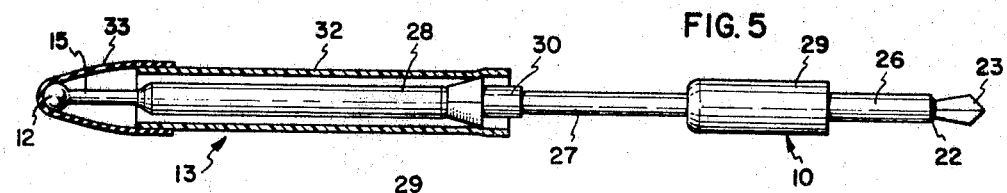
Figure 6:

FIG. 1 is a perspective view of an electronic thermometer, equipped with a probe of the invention and with a disposable sheath shown in perspective at the side of the probe;

FIG. 2, a side elevation view of the probe, drawn to a larger scale than is FIG. 1;

FIG. 3, a horizontal section, taken on the line 3—3 of FIG. 2 and drawn to a still larger scale, for clarity;

FIG. 4, a view like FIG. 2, but with a sheath, shown in vertical section, on the probe and stretched to its maximum test position;

FIG. 5, a view like FIG. 4, but with the sheath relaxed to its use position; and FIG. 6, a vertical section, taken on the line 6—6 of FIG. 2.

Detailed description

Referring now to the drawings:

In the illustrated preferred embodiment, the probe 10 of the invention is adapted to fit into an opening provided therefor in a control box, shown generally at 11, but it should be obvious that the probe could as well be connected to the control box by a suitable extension cord (not shown).

The control box is preferably small enough to be easily held in the user's hand and can be easily manipulated with one hand.

The probe 10 is elongate and of small diameter to facilitate its insertion into a body cavity of a patient and is provided at one end with a smooth ball 12, large enough to prevent body tissue being punctured or the patient being otherwise injured as the probe is inserted. The smooth ball also enables a protective sheath 13 to be stretched over the end of the probe without tearing of the sheath.

Ball 12 is preferably made of a highly heat conductive material such as silver, plated with a thin coating of tin to increase its durability and with a flat, wafer-type, thermistor 14 placed therein as an element whose resistance varies in accordance with the surrounding temperature. The wafer-type thermistor has proved especially useful in this application because it is especially stable within the range of temperatures concerned.

Ball 12 is soldered, or otherwise electrically connected to one end of a tube 15, made of stainless steel or other suitable, electrically conductive and non-corrosive material. One lead 16 from thermistor 14 is then electrically connected to the ball 12 and the other lead 17 is passed through a glass tube 18 and is connected to an insulated wire 19 that extends through tube 15. The glass tube 18 acts as an electrical insulator for the uninsulated lead 17 and assists in transmitting heat to the thermistor. A mass of rubber 20 at each end of the glass tube 18, helps protect the tube against breaking and the mass 20 at the end, remote from the tip, protects the junction of lead 17 and insulated wire 19.

A heat conductive, adhesive material 21 is placed in ball 12 to surround thermistor 14 and to hold it in place within the ball. This adhesive material 21 may, for example, be a suitable heat conductive adhesive. In any event, the ambient temperature is rapidly transmitted through the wall of ball 12, and the heat conductive adhesive material 21, to the thermistor 14, to change the resistance of the thermistor in accordance with the ambient temperature.

Tube 15 extends essentially the full length of the probe, terminating at a non-conductive, adhesive member 22, to which is affixed a conductive coupling member 23. The wire 19 is passed through tube 15 and is electrically connected to coupling member 23, so that when the probe is inserted into the control box 11 (or a fitting on an extension cord, not shown) the coupling member 23 will connect wire 19 and thermistor 14 into a circuit, such that the temperature around ball 12 will be indicated on a dial 24 on the control box, whenever actuating button 25 on the side of the button is pushed.

The circuit through the thermistor is completed through tube 15, which acts as a lead and through a short sleeve section 26 of conductive material electrically affixed to tube 15, adjacent to the non-conductive, adhesive member 22. Sleeve section 26, like coupling member 23 is inserted into control box 11, to be connected into the circuit, which is not shown here in detail, but which can, for example, be like the circuit fully disclosed in the aforementioned application for patent of John D. Ensign and David M. Allen.

Sections of a rigid, reinforcement tube 27 extend from short sleeve section 26 toward the ball 12, with the sections being spaced along and fitting tightly on tube 15. A strong, flexible outer sleeve member 28, made of Teflon or similar durable material is fitted tightly over sleeve 27, spanning the distance 15a, FIG. 3, between the spaced sections.

With this construction, tube 15, which is bendable, is held against bending throughout most of its length by the reinforcement tube sections 27, but can bend within the distance between the spaced tube sections. However, the bendable sleeve member 28 only allows limited bending, not sufficient for tube 15 to become fatigued and break. Because the distance from the tip of the probe to the portion between sections 27 is greater than the short distance from the tip to the first such section, bending will occur between the sections 27 rather than adjacent to the tip.

A stop 29, fixed to sleeve section 27, adjacent to conductive sleeve 26, serves as a gripping member as the probe is inserted into the control box 11 and also acts as a limit stop for a sheath retainer 30 that is slidably mounted on sleeve section 27. Another stop 31, is fixed against the end of flexible sleeve member 28 so that the sheath retainer will slide between the stops 29 and 31.

Although other configurations of sheath retainer can be used, the one illustrated has proven very satisfactory. As illustrated, it has a generally truncated pyramid configuration with four sides and a large base at the end nearest stop 29 and being smaller at the end near stop 31. With this configuration the corners formed by the engaging sides of the square serve as protuberances to engage and grip the interior surfaces of the rigid or semi-rigid portion 32 of the sheath 13. The flexible diaphragm 33 of the sheath can then be stretched tautly around ball 12 and the sheath will be held securely in place.

When the sheath is installed on the probe the retainer 30 is slid to be in abutment with stop 29. This stretches the diaphragm 33 far more than is necessary for satisfactory heat transfer to and through ball 12 and tests the diaphragm to see if it is sufficiently durable for use. If the diaphragm does not rupture during this testing, it will withstand all normal usage.

After the test of the sheath has been completed, the diaphragm is allowed to relax and to pull the sheath and the retainer toward the probe tip, until the retainer engages stop 31. At this time the sheath covered probe is ready for use.

The probe herein described, enables an accurate temperature to be rapidly obtained. It is safe and easy to use, with the probe being sufficiently stiff to facilitate handling, yet, bendable so that it will not injure a patient. The use of the disposable sheath reduces time and labor, otherwise required for sterilization and with the present probe it is possible to test the sheaths to be sure they will not fail during use.

Although a preferred form of my invention has been herein disclosed, it is understood that the present disclosure is made by way of example and that variations are possible without departing from the subject matter encompassed within the scope of the following claims, which subject matter I regard as my invention.

I claim:

1. A probe, for use with a control box as an electronic thermometer, comprising:
    a small diameter inner tube of stiff but bendable material;
    a hollow ball of material having rapid heat conducting characteristics at one end of the inner tube;
    a thermistor fixed inside the ball;
    a coupling member at the other end of the tube;
    means for connecting the thermistor into an electrical circuit when said coupling member is connected to the control box of the electronic thermometer;
    sections of rigid reinforcement tube surrounding the inner tube, with a space between the said sections;
    a flexible outer tube, fixed to the sections of rigid tube and spanning the space between them to limit bending of the inner tube;
    a first stop fixed to a section of rigid tube adjacent to the coupling member;
    another stop fixed to the same section of rigid tube, a spaced distance away from the first stop; and
    a sheath retainer slidably mounted on the said section of rigid tube between the said stops.

2. A probe, as in claim 1, wherein the inner tube is conductive and the means for connecting the thermistor into an electrical circuit includes:

a first lead electrically interconnecting the thermistor and the tube; and another lead passing through the tube and electrically interconnecting the thermistor and the coupling member.

3. A probe, as in claim 1, wherein the sheath retainer has protuberances thereon to frictionally grip the inside of a sheath.

4. A temperature sensing probe comprising:

an elongate member having a temperature sensitive element at one end thereof;

a pair of stops spaced along the elongate member; and sheath retainer means slidably mounted on the elongate member and slidable between said stops, whereby a resilient sheath placed over the temperature sensitive element can be secured to the sheath retainer means to be stretched for testing and thereafter be relaxed for use.

5. A temperature sensing probe according to claim 4, wherein the sheath retainer means includes protuberances extending outwardly therefrom to frictionally grip the inside of a sheath placed over the temperature sensitive element.

6. A temperature sensing probe according to claim 4, wherein:

means are provided to make the elongate member substantially rigid over spaced portions of its length; and wherein means are provided to limit the bending of the elongate member throughout a portion thereof not made substantially rigid.

References Cited

UNITED STATES PATENTS

| | | | |
|---|---|---|---|
| 2,351,455 | 6/1944 | Pratesi | 73—372 |
| 2,938,385 | 5/1960 | Mack et al. | |
| 3,221,555 | 12/1965 | Biber | 206—16.5 |
| 3,254,533 | 6/1966 | Tongret. | |
| 3,349,896 | 10/1967 | Ensign et al. | 73—362 X |
| 3,367,186 | 2/1968 | Ensign et al. | 73—362 |

FOREIGN PATENTS 574,849  1/1946  Great Britain.

REUBEN EPSTEIN, Primary Examiner

U.S. Cl. X.R.

73—362